July 26, 1927.

A. L. V. C. DEBRIE 1,636,736

FOCUSING DEVICE FOR CINEMATOGRAPHIC AND PHOTOGRAPHIC VIEW TAKING APPARATUS

Filed April 12, 1926     2 Sheets-Sheet 1

Inventor
A. L. V. C. Debrie
by Langner, Parry, Card & Langner
Atty's.

July 26, 1927.  1,636,736
A. L. V. C. DEBRIE
FOCUSING DEVICE FOR CINEMATOGRAPHIC AND PHOTOGRAPHIC VIEW TAKING APPARATUS
Filed April 12, 1926    2 Sheets-Sheet 2

Inventor
A. L. V. C. Debrie
by Lampert, Parry, Yard & Lampert
Att'ys.

Patented July 26, 1927.

1,636,736

UNITED STATES PATENT OFFICE.

ANDRÉ LEON VICTOR CLEMENT DEBRIE, OF PARIS, FRANCE.

FOCUSING DEVICE FOR CINEMATOGRAPHIC AND PHOTOGRAPHIC VIEW-TAKING APPARATUS.

Application filed April 12, 1926, Serial No. 101,512, and in France April 25, 1925.

It is necessary when a photograph and especially a series of cinematographic pictures are being taken that the focusing of the apparatus should be proceeded with; many arrangements have been proposed in view of providing for this operation, but none have yet proven satisfactory either because they appear as rather intricate mechanical arrangements or else because they do not answer perfectly all the requirements of a suitable working as they require for instance a setting for each view or show some other drawback.

The present invention has for its object a mechanically very simple focusing device which is of a very easy handling.

The whole of the device can rotate round its axis for instance inside a stationary collar which is secured to the support of the device and which bears an object-glass-holding plate; this plate can be a turret of the known type on which are disposed a number of different object-glasses. The rotation of the device allows when the focusing is to be proceeded with, a rough glass to be brought in place of the view taking aperture. This glass can be examined through a magnifying glass also secured to the rotating part and the frame of the rough glass can be, if necessary, rotated through a suitable gearwork so as to be brought in exact coincidence as to direction with the location of the view taking aperture.

It can also be of interest to follow the scene whilst the pictures are being taken so as to watch the focusing as well as the setting of the pictures. In view of this the object-glass-holding plate is provided as known in the art with two object-glasses (or with several sets of two object-glasses in case the plate is made up as a turret) one of which is disposed in front of the location of the view taking aperture and the other in front of the position occupied by the rough glass whilst the views are being taken; these two object-glasses can both slide as is well known in the art in a socket and are secured together so as to provide for the simultaneous focusing with both object-glasses.

A form of execution of the invention is shown by way of example on appended drawings whereof:

Figure 1:
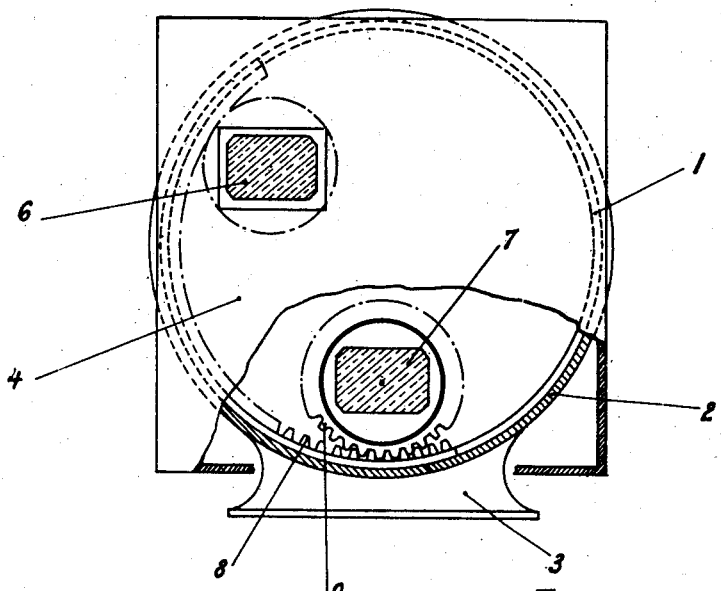
Fig. 1 is a front view of the whole device.

The main part of the view taking apparatus comprising the rear casing thereof 1, the film and the film driving mechanism diagrammatically shown at 1', the view taking aperture 6 and the focusing arrangement described hereinbelow is adapted to rotate round its axis with reference to the object-glass (or glasses) 5 inside a collar secured to the supporting member 3. A plate 4 is secured to the front of the collar 2 and bears the view taking object-glass 5 disposed in front of the location of the view taking aperture 6 during operation. The apparatus 1 is provided with a rough glass 7 having the same size as the aperture 6 and adapted to come when the apparatus 1 is made to rotate round its axis inside the collar 2, into the position occupied normally by this aperture.

To the collar 2 is secured a rack 8 having the shape of an arc of a circle and meshing with a toothed wheel 9 mounted on a socket 10 holding the rough glass and the required screens. This socket is of the same size as the view taking aperture and rotates inside a bearing 11 secured to the body of the apparatus 1. A magnifying glass 12 is disposed in alignment with the socket and allows the rough glass to be examined.

Thus it is evident that when the whole of the apparatus is rotated in the bearing collar 2, the socket 10 rotates round its axis whilst moving along the rack 8. The gear work is calculated so that when the rough glass 7 arrives in the position normally occupied by the aperture 6, its long and small sides are respectively parallel to the long and small sides of the aperture. In the form of execution shown on Fig. 1 where the rough glass 7 appears in the position it occupies whilst the views are being taken, it is necessary that the socket 10 should rotate round its axis a whole number of half-revolutions whilst the apparatus 1 rotates by the amount necessary for bringing the rough glass 7 in the place occupied by the aperture 6.

When the apparatus is in this latter position the film which was originally in front of the object-glass 5 has moved towards the right of Fig. 1 and it is thus an easy matter to examine and to focus by means of the magnifying glass 12, the rough glass 7 and the object-glass 5.

Of course the rack and the toothed wheel 9 could be suppressed if the rough glass were set at 180° of the view taking aperture.

In view of allowing the scene to be constantly followed during the view taking, the plate 4 is provided in front of the location of the rough glass 7 during operation, with a second aperture wherein is set the finder or examining object-glass 13.

Figure 3:
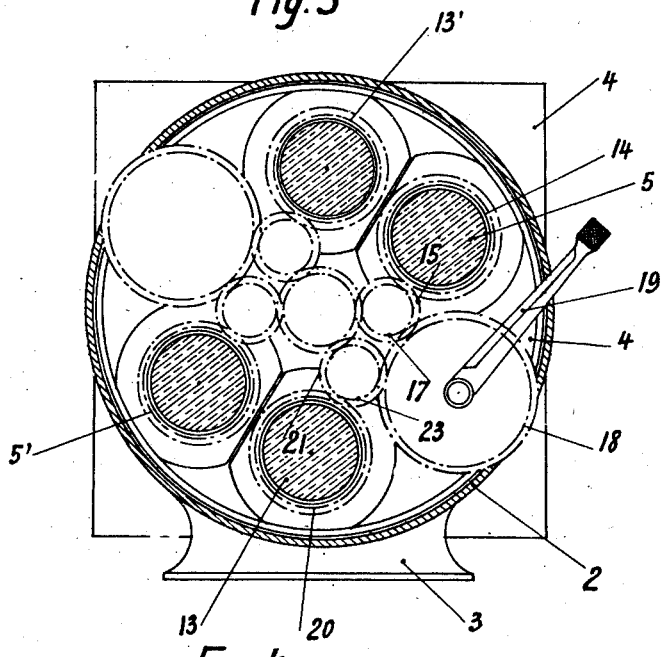
Fig. 3 is a front view of a similar device provided with a turret or object-glass-holding plate showing the arrangement for simultaneously focusing with the two object-glasses.

The plate 4 can be made up as a turret, which can also rotate with reference to the bearing collar 2 and bears a certain number of view taking object-glasses 5 and of examining object-glasses 13 so that any pair of such object-glasses may be used ad libitum, according to the requirements. In the forms of execution shown on Figs. 3 and 4, the plate 4 is made up as a turret provided with two view taking object-glasses 5 and 5' and two object-glasses for examination purposes 13 and 13'.

Figure 2:
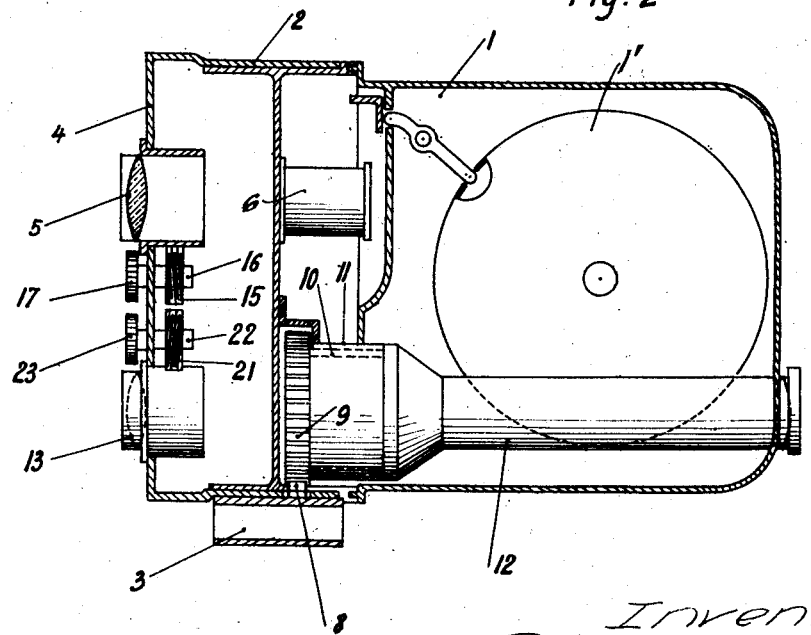
Fig. 2 is a corresponding lateral cross-sectional view.

As stated hereinabove, it is important to focus simultaneously with the view taking object-glass and with the corresponding object-glass, both of which slide in suitable guides. This result can be achieved in several manners. A first form of execution is shown on Figs. 2 and 3.

The object-glass 5 is set in a part secured to a socket 14 round which a helical rack is cut and meshing with a worm 15 keyed to shaft 16. To this same shaft is keyed moreover a pinion 17 meshing with a large pinion 18 controlled through the lever 19. In a similar manner, the object-glass 13 is set in a part secured to a socket 20 round which a helical rack is cut and meshing with a worm 21 keyed to the shaft 22 to the end of which is keyed a pinion 23 meshing with the large pinion 18. It can be seen that when this latter pinion is rotated through the lever 19, the object-glasses 5 and 13 are rotated in the same direction and are pushed by the same amount down their guiding tube whereby their simultaneous focusing is effected.

A similar device may provide in a similar manner for the simultaneous focusing of the object-glasses 5' and 13'.

Figure 5:
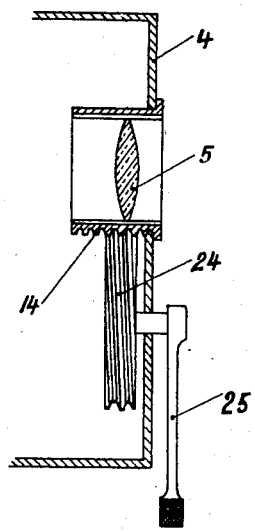
Fig. 5 is a partly sectional side view of the arrangement shown on Fig. 4.
Figure 4:
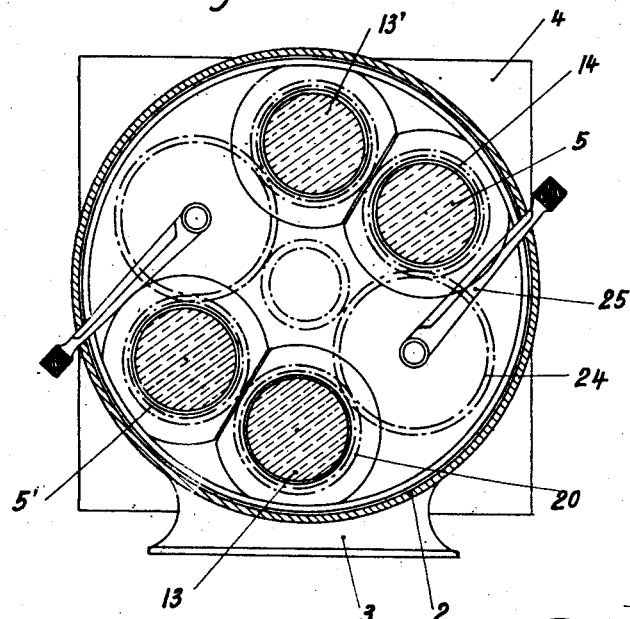
Fig. 4 is a similar view of a modified form of the said arrangement.

In the form of execution shown by Figs. 4 and 5 the sockets 14 and 20 of the object-glasses 5 and 13 are provided with helical racks and both engage a worm 24 controlled through the lever 25. The manner of working is exactly the same as in the preceding case.

Figure 6:
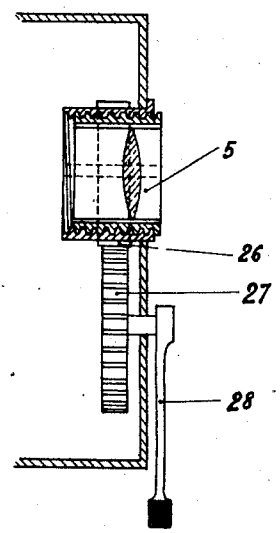
Fig. 6 is a view, similar to Fig. 5 of a modified form of this arrangement.

Lastly the object-glasses 5 and 13 can be secured each in a helical mounting of any known type, the rotating ring of which is outwardly cut so as to appear as a straight gear such as 26 which is controlled by a pinion 27 secured to the lever 28 and bearing the graduations for focusing (Fig. 6).

In the case where the object-glass-holding plate is made up as a turret, the setting of the pictures and the focusing could be made, instead of through a special object-glass, simply through one of the view taking object glasses provided on the turret which is in front of the rough glass when the object glass used for the view taking is in front of the exposure aperture. But in this case, the object-glasses used respectively for the focusing and for the view-taking have different focal lengths. Therefore if a correct focusing is to be effected, it is sufficient to provide for a suitable ratio between the movements of the two object-glasses in their mounting instead of their being equal as in the abovementioned case wherein the two glasses have equal lengths: whatever the kind of mounting they are set in, whether threaded or helical, gear or rod controlled the ratio between the movements of the glasses should be equal to the ratio between the focal lengths.

The abovedescribed forms of execution can be used also in this case: gear wheels and worms of different pitch may be used or else on the contrary gear wheels and worms of equal pitch may be used in combination with object-glass mountings which show either slopes or threads calculated in view of making the simultaneous movements of the glasses considered allow constantly a correct focusing for both glasses.

This arrangement allows not only the scene to be observed whilst the view taking is being proceeded with; but in a great number of cases it is sufficient to provide for the initial focusing, without the rotation of the whole apparatus being necessary; it can be used even with view taking apparatus which are not devised for rotating round their axis.

What I claim is:

1. A focusing device for cinematographic and photographic view taking apparatus comprising a supporting collar, a plate secured to same, object-glasses secured to said plate, a view taking device adapted to rotate around its axis in said collar and provided with a view taking aperture, a rough glass secured to the said device and parallel to the plane of the said aperture, the said aperture and rough glass being disposed at the same distance from the axis of the device as the object glasses.

2. A focusing device for cinematographic and photographic view taking apparatus comprising a supporting collar, a plate secured to same, object-glasses secured to said plate, a view taking device adapted to rotate round its axis in said collar and provided with a view taking aperture, a toothed frame pivotally secured to same, a rough-glass set in said frame, a circular rack round the supporting collar meshing with the toothed frame, the said aperture and rough glass being disposed at the same distance from the axis of the device as the object glasses, the gear ratio between the frame and the rack being such as will cause the rough glass to have its sides parallel to those of the view taking aperture when it comes in the place normally held by latter.

3. A focusing device for cinematographic and photographic view taking apparatus comprising a supporting collar, a plate secured to same, object glasses secured to said plate, a view taking device adapted to rotate round its axis in said collar and provided with a view taking aperture, a rough glass secured to same and parallel to the plane of said aperture the said aperture and rough glass being disposed at the same distance from the axis of the device as the object glasses and finders used for examination purposes set in the abovementioned plate opposite the location of the rough glass when the aperture is in front of the corresponding object glass.

4. A focusing device for cinematographic and photographic view taking apparatus comprising a supporting collar, a rotating plate secured to same, object glasses secured to said plate, a view taking device adapted to rotate round its axis in said collar and provided with a view taking aperture, a rough glass secured to same and parallel to the plane of said aperture, the said aperture and rough glass being disposed at the same distance from the axis of the device as the object glasses and finders used for examination purposes set in the abovementioned plate opposite the location of the rough glass when the aperture is in front of the corresponding object glass, and means for simultaneously focusing each finder used for examination purposes with the corresponding view taking object glass.

5. A focusing device for cinematographic and photographic view taking apparatus comprising a supporting collar, a rotating plate secured to same, object glasses secured to said plate, a view taking device adapted to rotate round its axis in said collar and provided with a view taking aperture, a rough glass secured to same and parallel to the plane of said aperture, the said aperture and rough glass being disposed at the same distance from the axis of the device as the object glasses and finders used for examination purposes set in the abovementioned plate opposite the location of the rough glass when the aperture is in front of the corresponding object glass, a mounting for each object glass and finder provided with a toothed part and a gear work connecting each mounting with a control lever and means whereby the gearwork of each finder used for examination purposes meshes with the gearwork of the corresponding view taking object glass in view of the simultaneous focusing of both glasses.

6. A focusing device for cinematographic and photographic view taking apparatus comprising a supporting collar, a plate secured to same, object glasses secured to said plate, a view taking device adapted to rotate round its axis in said collar and provided with a view taking aperture, a rough glass secured to same and parallel to the plane of said aperture, the said aperture and round glass being disposed at the same distance from the axis of the device as the object glasses and finders used for examination purposes set in the abovementioned plate opposite the location of the rough glass when the aperture is in front of the corresponding object glass, a mounting for each object glass and finder provided with a suitably sloped helical rack, a toothed ring engaging said rack and disposed round the mounting, a control lever, a worm borne by same and meshing with the toothed rings of the corresponding finder and object glass.

In testimony whereof I have affixed my signature.

ANDRÉ LEON VICTOR CLEMENT DEBRIE.